Oct. 10, 1961 R. A. COBB 3,003,269
MECHANICAL CODING DEVICE
Filed Dec. 14, 1959

INVENTOR.
Russell A. Cobb
BY
Novey, Schmidt, Johnson & Hovey
ATTORNEYS.

United States Patent Office 3,003,269
Patented Oct. 10, 1961

3,003,269
MECHANICAL CODING DEVICE
Russell A. Cobb, 1405 Russell Road, Kansas City, Mo.
Filed Dec. 14, 1959, Ser. No. 859,304
6 Claims. (Cl. 40—70)

This invention relates to indicia presenting marking devices and more particularly to a mechanical coding device which may be used to identify and designate the contents and destination of unmanned freight vehicles.

In large freight warehouses which receive and store freight of all kinds the use of freight carrying vehicles is quite prevalent in order to move the goods received by the warehouse from the receiving point to a position of storage and also from the position of storage to the shipping or loading area. Such vehicles are commonly unmanned, the same being operated and guided by mechanical means to move the same from one part of the warehouse to another, thus speeding the movement of such vehicles and eliminating the need for additional manpower. In view of the fact that such freight carrying vehicles move from one point to another without the presence of operating personnel, it has been a common practice for the person who loads the vehicle to indicate by some means the destination of the vehicle and the classification of freight carried thereby. Such means have, in the past, taken the form of a slate or blackboard which is attached to the freight carrying vehicle and which may be marked upon by the loading operator with chalk or the like to indicate the desired information. The use of such a marking device for freight carrying vehicles has given rise to many problems such as illegibility, the inadvertent erasure of important indicia, the necessity for a person to remove his gloves to be able to write upon the blackboard, and the need for continual time-consuming erasures of the blackboard.

The present invention is intended to eliminate such problems through the provision of a mechanical coding device which is intended to replace such blackboards or slates as above described and to accomplish the same result in a neater, more legible and more efficient manner.

It is, therefore, the most important object of this invention to provide a mechanical coding device for attachment to freight vehicles and the like, which device may be utilized to indicate the destination or classification of freight carried by such a vehicle.

It is a further object of this invention to provide a mechanical coding device adapted to be mounted on a freight carrying vehicle, which device may be operated in a rapid manner by the rotation of indicia bearing discs which are locked in place in such a manner that there is no possibility of elimination or changing of the indicia during the movement of the vehicle from one point to another by mechanical means.

A yet further object of the present invention is to provide a mechanical coding device for freight carrying vehicles, which device has as a part thereof a number of overlapping disc-like members, each of said members having a plurality of identification indicia in radially spaced relationship on one face thereof, the members being rotatably mounted on and supported by a front plate, which plate has apertures therein whereby, upon rotation of the members, selected indicia thereof may be viewed through said apertures.

A yet further object of this invention is to provide a mechanical coding device which has a plurality of disc-like members carried by a front plate, the front plate having flange means associated therewith adjacent the lowermost longitudinal edge thereof, and the disc-like members having a series of substantially rectilinear edge segments which may be selectively engaged with the flange means associated with the front plate to lock the members in a predetermined position whereby the desired indicia thereupon is visible through an aperture in the front plate.

Other important objects of this invention include details of construction and assembly which will become apparent from the following specification and accompanying drawing, wherein.

Figure 1:
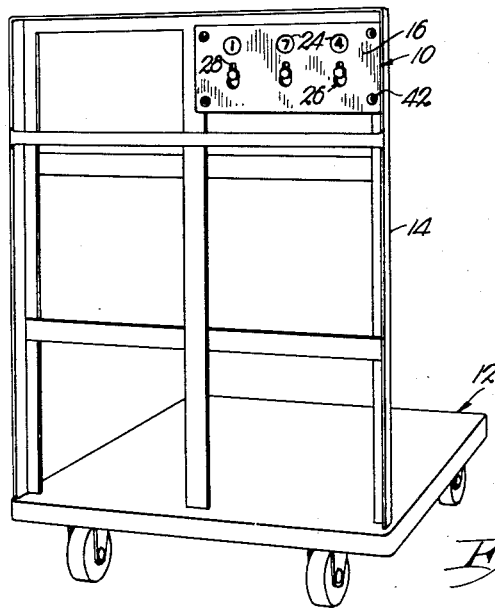
FIGURE 1 is a perspective view of a freight carrying vehicle, the mechanical coding device forming the subject matter of the present invention being mounted thereupon.
Figure 2:
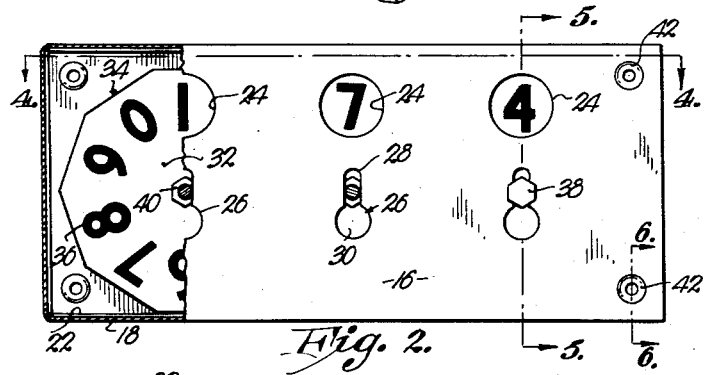
FIG. 2 is a front elevational view of the mechanical coding device, parts being broken away to reveal details of construction.

The mechanical coding device 10 forming the subject matter of the present invention is intended to be used in connection with a freight carrying vehicle designated as 12 in FIG. 1 by attaching said device 10 to an upright portion 14 of said vehicle which is normally comprised of a plurality of vertical and horizontal beams. Device 10 is preferably mounted adjacent the upper part of portion 14 whereby it may be easily reached for operation and where the indicia bearing members thereof are at substantially eye level or slightly below. Coding device 10 has as a part thereof a substantially rectangular front plate 16 having a laterally extending flange 18 formed adjacent the outer edges thereof and substantially circumscribing plate 16. A rear plate 20 is of substantially the same dimensions as front plate 16 and likewise has a laterally extending flange 22 formed at the peripheral edges thereof in substantially circumscribing relationship to rear plate 20. Front plate 16 has a plurality of circular apertures 24 formed therein, said apertures being spaced from the normally uppermost longitudinal edge of front plate 16 and spaced from each other substantially equidistant across the upper portion of front plate 16. Below each of apertures 24 is a keyhole-shaped slot 26 formed in front plate 16, each of said slots having an uppermost elongated portion 28 and a lowermost circular portion 30. As best seen in FIG. 2, slots 26 are disposed immediately below their corresponding apertures 24 and are aligned at substantially the center of front plate 16.

Figure 4:
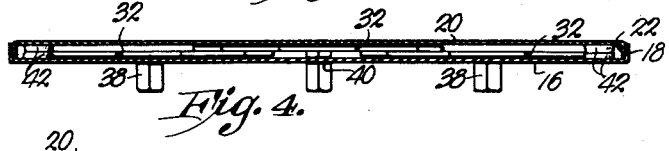
FIG. 4 is a longitudinal sectional view taken along line 4—4 of FIG. 2.
Figure 3:
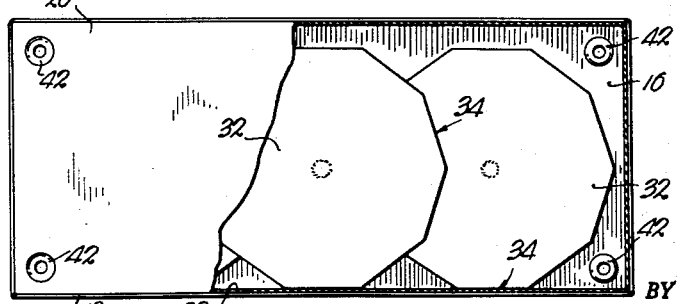
FIG. 3 is a rear elevational view of the mechanical coding device, parts being broken away to reveal details of construction.

Front plate 16 and rear plate 20 are disposed in substantially parallel relationship, the flange 22 of rear plate 20 overlying the flange 18 of front plate 16 and serving as a means for spacing rear plate 20 from front plate 16 whereby a space is left between said plates 16 and 20 when disposed in the above-mentioned relationship. A plurality of disc-like polygonal members 32 are carried within the space between plate 16 and plate 20, said members 32 being in overlapping relationship, as best seen in FIGS. 3 and 4, whereby a maximum number of such members 32 may be disposed within a minimum amount of space as between plates 16 and 20. As seen in FIGS. 3 and 4, the outermost members 32 are disposed in close relationship to front plate 16 and the intermediate or middle member 32 is disposed rearwardly of the outermost members 32 in a position adjacent rear plate 20. Members 32 are each identical in configuration and have a plurality of substantially rectilinear edge segments 34 of generally equal length on the peripheral edges thereof. Corresponding to each of said edge segments 34 is suitable indicia such as 36 which may be either painted upon one face of members 32 or placed thereupon by means of a decal, it being noted that indicia 36 are on the faces of members 32, which are disposed immediately normally rearwardly of front plate 16.

Figure 5:
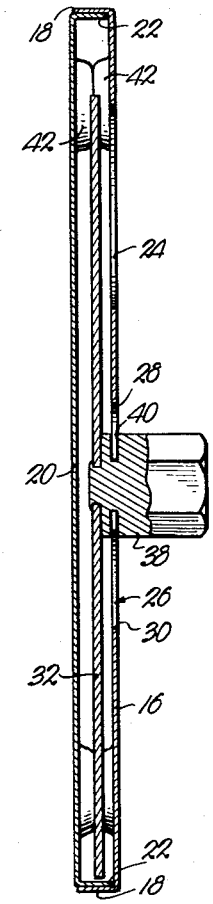
FIG. 5 is a transverse, enlarged, sectional view taken along line 5—5 of FIG. 2.

Each of members 32 is provided with a shaft 38 in substantially axial relationship thereto, which shafts extend through slots 26. Shafts 38 are secured to members 32 at substantialy the center of their respective members, said shafts 38 each having an annular groove 40 formed therein, which grooves 40 receive the edges of front plate 16 defining slots 26, all as best seen in FIG. 5.

As is apparent, members 32 may be rotatably actuated by grasping the respective shafts 38 and sliding the same upwardly with respect to slots 26 whereby the members 32 can be rotated to dispose the desired indicia in such a position that it is visible through the respective apertures 24. When members 32 have been so rotated it will be recognized that when the operator's grip upon shaft 38 is released the member 32 carried thereby will, by force of gravity, move downwardly to a position whereby the edge segment 34 thereof opposite to the edge segment adjacent which the indicia disposed within aperture 24 is located will come to rest upon flange 22 of rear plate 20. Thus the members 32, as a result of the rectilinear segments 34 thereof resting upon longitudinally extending flange 22, are locked in position both with respect to plates 16 and 20 and with respect to their adjacent members. It will be appreciated that members 32 are preferably made from a heavy gauge metal and therefore will not be moved from their gravity-locked position as a result of the rough movement of vehicle 12 as it is moved from one location to another.

In assembling device 10 it will be apparent that the rear plate may be initially placed in a flat position upon a horizontal surface, and the members 32 laid therewithin in overlapping relationship, shafts 38 being preferably attached to members 32 and extending upwardly therefrom when said members are in a flat position within rear plate 20, as above described. To complete the assembly of the device 10 plate 16 is moved into position overlying rear plate 20 and members 32, the lowermost circular portion of slots 26 being of such size that shafts 38 on members 32 may pass through their respective slots 26. Once shafts 38 have been extended through portions 30 of slots 26 as above described, plate 16 can be moved to a position wherein shafts 38 are disposed in the position shown in FIG. 2 with the annular grooves 40 thereof receiving the edges of the upper elongated portion 28 of slots 26. Flanges 18 and 22 can then be interengaged by suitable means such as welding or the like and the device 10 will be completely assembled.

Figure 6:
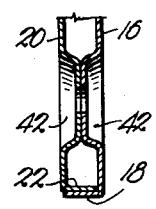
FIG. 6 is an enlarged sectional view taken along line 6—6 of FIG. 2.

In order to mount marking device 10 upon a vehicle such as 12 the corners of front plate 16 and rear plate 20 are provided with corresponding dished-out portions such as 42, said portions having perforations formed therethrough, which perforations are in alignment for receiving a screw or other suitable means for attaching device 10 to a vehicle such as 12, such attaching structure being best shown in FIG. 6.

Having thus described the invention what is claimed as new and desired to be secured by Letters Patent is:

1. A mechanical coding device comprising a front plate; flange means associated with said plate and extending laterally therefrom, said plate having an elongated slot therein disposed with the longitudinal length thereof normal to said flange means and an aperture in spaced relationship to said slot; a polygonal member having a plurality of identification indicia in radially spaced relationship on one face thereof; and rotative means mounting the member on said plate in a normally vertical plane and in a position with one of the indicia thereon in alignment with and discernible through the aperture when one segment of the peripheral edge of said member is in engagement with and supported by said flange means, said rotative means including a shaft secured to the member in substantially axial relationship thereto said shaft extending through and being freely slidable within said slot, the latter being of sufficient length to permit manual movement of the shaft and thereby the member in a direction away from the flange means a distance to cause the peripheral edge of the member to clear the flange means, whereby the member may be rotated within said plane about the axis thereof to bring another one of said indicia into a position aligned with said aperture when the corresponding segment of said edge of the member is moved into engagement with the flange means.

2. A mechanical coding device as set forth in claim 1 wherein said member is provided with a series of substantially rectilinear edge segments of generally equal length, there being a different indicia radially aligned with and spaced from corresponding edge segments of the member.

3. A mechanical coding device as set forth in claim 1 wherein is provided a back plate having dimensions substantially the same as said front plate and spaced therefrom, said flange means engaging said plates at the peripheral edges thereof.

4. A mechanical coding device comprising a front plate; a back plate having dimensions substantially the same as said front plate and spaced therefrom; flange means associated with said plates and extending laterally therefrom at the peripheral edges thereof, said front plate having a plurality of elongated slots therein disposed with the longitudinal length thereof normal to said flange means and an aperture for each slot in spaced relationship thereto; a polygonal member for each of said slots, each of said members having a plurality of identification indicia on one face thereof, and having a series of substantially rectilinear peripheral edge segments of generally equal length, there being a different indicia radially aligned with and spaced from corresponding edge segments; and rotative means mounting said members in spaced, normally vertical planes between said plates and on said front plate, each of said members being in overlapping relationship to proximal members and in a position with one of the indicia thereon in alignment with and discernible through the corresponding aperture when one of said segments of said member is in engagement with and supported by said flange means, said rotative means including a shaft secured to the member in substantially axial relationship thereto, each of said shafts extending through and being freely slidable within the corresponding slot, the latter being of sufficient length to permit manual movement of the shaft and thereby the member in a direction away from the flange means a distance to cause the peripheral edge of the member to clear the flange means, whereby the member may be rotated within its plane about the axis thereof to bring another one of said indicia into a position aligned with said aperture when the corresponding segment of said edge of the member is moved into engagement with the flange means.

5. A mechanical coding device as set forth in claim 4 wherein said members are biased toward said flange means by the force of gravity.

6. A mechanical coding device as set forth in claim 4 wherein is provided a knob secured to each of said shafts for manual rotation and reciprocation of said members in their corresponding seats, said knobs having a transverse width greater than the corresponding dimension of said slots, thereby precluding substantial movement of said member along the axis of said shaft.

References Cited in the file of this patent

UNITED STATES PATENTS

| | | |
|---|---|---|
| 683,598 | Furbush | Oct. 1, 1901 |
| 1,232,120 | Sutter | July 3, 1917 |
| 1,581,374 | Youngs | Apr. 20, 1926 |
| 1,829,295 | Phagans | Oct. 27, 1931 |
| 1,971,508 | Seliga | Aug. 28, 1934 |